(12) United States Patent
Tamura et al.

(10) Patent No.: US 12,706,327 B2
(45) Date of Patent: Aug. 11, 2026

(54) BATTERY

(71) Applicant: Panasonic Intellectual Property Management Co., Ltd., Osaka (JP)

(72) Inventors: Takaaki Tamura, Osaka (JP); Kazuhiro Morioka, Osaka (JP); Seiji Nishiyama, Osaka (JP); Akira Kawase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 833 days.

(21) Appl. No.: 18/046,166

(22) Filed: Oct. 13, 2022

(65) Prior Publication Data

US 2023/0064131 A1 Mar. 2, 2023

Related U.S. Application Data

(63) Continuation of application No. PCT/JP2021/015825, filed on Apr. 19, 2021.

(30) Foreign Application Priority Data

May 13, 2020 (JP) ................................ 2020-084506

(51) Int. Cl.
*H01M 10/0585* (2010.01)
*H01M 10/052* (2010.01)
(Continued)

(52) U.S. Cl.
CPC ..... *H01M 10/0585* (2013.01); *H01M 10/052* (2013.01); *H01M 10/0562* (2013.01); *H01M 50/121* (2021.01); *H01M 50/131* (2021.01)

(58) Field of Classification Search
CPC .................. H01M 50/131–136; H01M 50/121
See application file for complete search history.

(56) References Cited

U.S. PATENT DOCUMENTS

2012/0155001 A1* 6/2012 Fujikawa ............ H01M 50/136 429/185
2013/0280598 A1 10/2013 Shigematsu et al.
(Continued)

FOREIGN PATENT DOCUMENTS

JP 9-283177 10/1997
JP 11-040198 2/1999
(Continued)

OTHER PUBLICATIONS

The EPC Office Action dated Oct. 8, 2024 for the related European Patent Application No. 21803638.2.
(Continued)

*Primary Examiner* — Robert S Carrico
(74) *Attorney, Agent, or Firm* — WHDA, LLP

(57) ABSTRACT

A battery includes a power-generating element having at least one unit cell including an electrode layer, a counter-electrode layer, and an electrolyte layer located between the electrode layer and the counter-electrode layer and an insulating member covering the power-generating element. The insulating member includes a first member that includes a first principal surface covering portion covering a first principal surface of the power-generating element and a second member, joined to the first member, that includes a second principal surface covering portion covering a second principal surface of the power-generating element opposite to the first principal surface. A junction between the first member and the second member overlaps a side surface of the power-generating element when seen from a direction perpendicular to the side surface. An elastic modulus of the first member is higher than an elastic modulus of the second member.

11 Claims, 7 Drawing Sheets

(51) Int. Cl.

| | |
|---|---|
| ***H01M 10/0562*** | (2010.01) |
| ***H01M 50/121*** | (2021.01) |
| ***H01M 50/131*** | (2021.01) |

(56) References Cited

U.S. PATENT DOCUMENTS

| | | | |
|---|---|---|---|
| 2015/0340727 | A1 | 11/2015 | Iwamoto et al. |
| 2018/0205119 | A1 | 7/2018 | Kodama |
| 2021/0167471 | A1 | 6/2021 | Nishide et al. |

FOREIGN PATENT DOCUMENTS

| | | |
|---|---|---|
| JP | 2004-103368 | 4/2004 |
| JP | 4233830 | 3/2009 |
| JP | 5804053 | 11/2015 |
| JP | 2016-1599 | 1/2016 |
| JP | 2018-116812 | 7/2018 |
| WO | 2012/081366 | 6/2012 |
| WO | 2012/141231 | 10/2012 |
| WO | 2020/031424 | 2/2020 |

OTHER PUBLICATIONS

International Search Report of PCT application No. PCT/JP2021/015825 dated Jul. 6, 2021.

* cited by examiner

BATTERY

BACKGROUND

1. Technical Field

The present disclosure relates to a battery.

2. Description of the Related Art

In general, a battery including a power-generating element obtained by laminating a positive-electrode layer, a solid electrolyte layer, and a negative-electrode layer is covered with a laminating film, insulating resin, or other members for the prevention of entry of moisture, protection from light, the prevention of short circuits, or other purposes.

For example, Japanese Unexamined Patent Application Publication No. 11-40198 discloses a battery having a power-generating element housed in a laminating film. Further, Japanese Unexamined Patent Application Publication No. 2018-116812 discloses a method for manufacturing a battery including covering a charged power-generating element with a thermosetting resin.

SUMMARY

However, although, in Japanese Unexamined Patent Application Publication No. 11-40198, the battery is housed in a laminating film having a thermally-adhesive resin, the presence of a cohesive zone of the laminating film on the outer periphery of the battery causes a decrease in energy density of the battery. Further, since the laminating film is made, for example, of a general-purpose thermoplastic resin such as polypropylene resin or polyethylene resin, the laminating film is often low in strength, with the result that the battery is vulnerable to external shocks or other impacts and the battery is low in reliability.

Further, in Japanese Unexamined Patent Application Publication No. 2018-116812, in order to keep a short circuit between electrodes and the strength of the battery, an insulating layer is formed by covering the power-generating element with a thermosetting resin with the power-generating element in a charged condition (i.e. a condition in which the power-generating element has expanded), and the insulating layer is inhibited from breaking. However, an attempt to impart strength to the insulating layer by increasing hardness ends up making it easy for the insulating layer to break when the power-generating element contracts, undesirably sacrificing the reliability of the battery.

One non-limiting and exemplary embodiment provides a highly-reliable battery.

In one general aspect, the techniques disclosed here feature a battery including a power-generating element having at least one unit cell including an electrode layer, a counter-electrode layer, and an electrolyte layer located between the electrode layer and the counter-electrode layer and an insulating member covering the power-generating element. The insulating member includes a first member that includes a first principal surface covering portion covering a first principal surface of the power-generating element and a second member, joined to the first member, that includes a second principal surface covering portion covering a second principal surface of the power-generating element opposite to the first principal surface. A junction between the first member and the second member overlaps a side surface of the power-generating element when seen from a direction perpendicular to the side surface. An elastic modulus of the first member is higher than an elastic modulus of the second member.

The present disclosure makes it possible to provide a highly-reliable battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits

BRIEF DESCRIPTION OF THE DRAWINGS

FIG. 1 is a schematic cross-sectional view of a battery according to Embodiment 1;

FIG. 2 is a schematic cross-sectional view of a battery according to Modification 1 of Embodiment 1;

FIG. 3 is a schematic cross-sectional view of a battery according to Modification 2 of Embodiment 1;

FIG. 5 is a schematic cross-sectional view of another battery according to Modification 3 of Embodiment 1;

DETAILED DESCRIPTIONS

Brief Overview of the Present Disclosure

Figure 4:
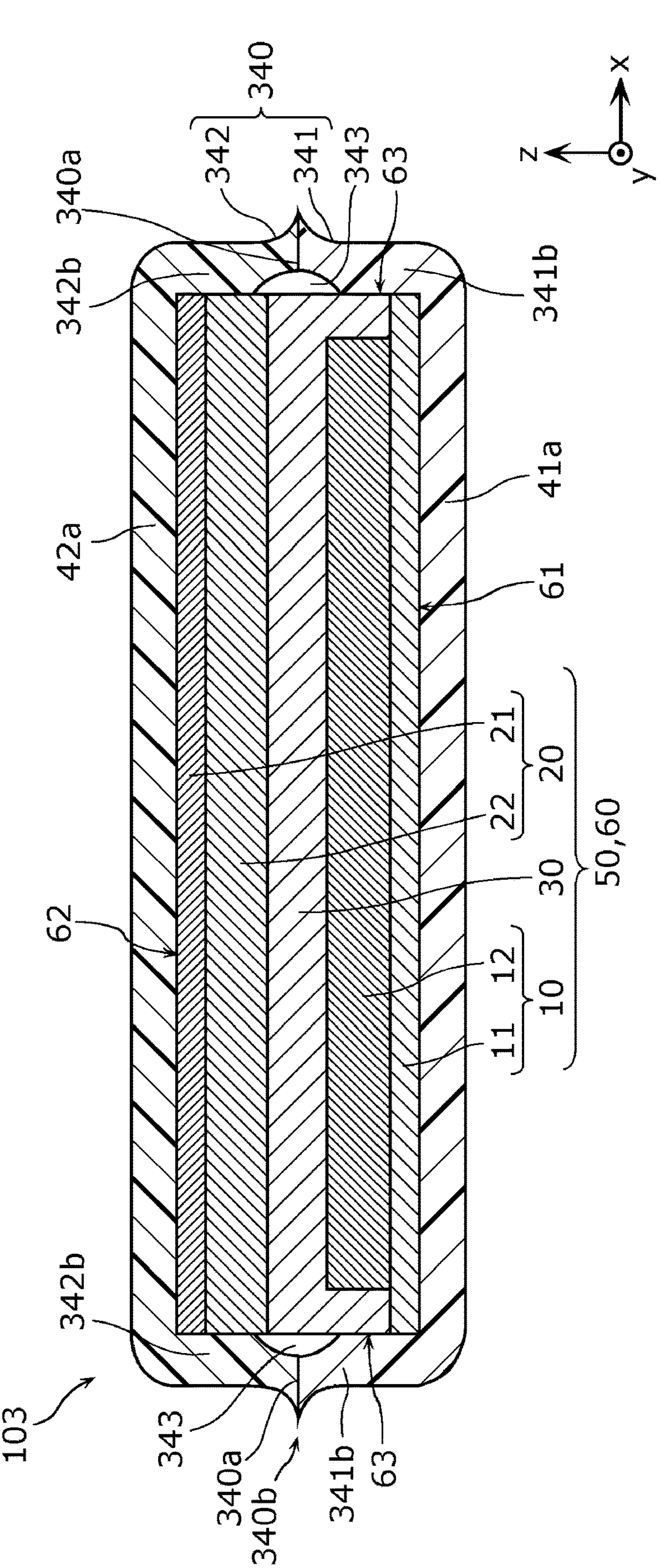
FIG. 4 is a schematic cross-sectional view of a battery according to Modification 3 of Embodiment 1.

The following gives a brief overview of an aspect of the present disclosure.

A battery according to an aspect of the present disclosure includes a power-generating element having at least one unit cell including an electrode layer, a counter-electrode layer, and an electrolyte layer located between the electrode layer and the counter-electrode layer and an insulating member covering the power-generating element. The insulating member includes a first member that includes a first principal surface covering portion covering a first principal surface of the power-generating element and a second member, joined to the first member, that includes a second principal surface covering portion covering a second principal surface of the power-generating element opposite to the first principal surface. A junction between the first member and the second member overlaps a side surface of the power-generating element when seen from a direction perpendicular to the side surface. An elastic modulus of the first member is higher than an elastic modulus of the second member.

This causes the power-generating element to be firmly protected by the first member, which is relatively high in modulus of elasticity, and causes the second member, which is relatively low in modulus of elasticity, to preferentially deform under stress caused by expansion and contraction of the power-generating element during charge and discharge, thereby reducing damage to the insulating member. Further, since the junction is located outside the side surface, the side surface is covered with the insulating member. Further, since the first member and the second member directly join together, the joint interface can be made smaller than in a case where the first member and the second member are joined together with use of another member. This reduces damage to the insulating member at the joint interface. This makes it possible to effectively protect the power-generating element, thus making it possible to achieve a highly-reliable battery.

Further, for example, the first principal surface covering portion and the second principal surface covering portion may be different in thickness from each other.

According to this, breakage of the insulating member can be inhibited, for example, by increasing the thickness of a principal surface that is susceptible to shocks such as vibrations and/or a principal surface to which stress is easily applied. This makes it possible to further enhance the reliability of the battery.

Further, for example, a thickness of the first principal surface covering portion may be greater than a thickness of the second principal surface covering portion.

This increase the thickness of the first principal surface covering portion of the first member, which is relatively high in modulus of elasticity, thus making it possible to further reduce damage to the power-generating element by external shocks or other impacts.

Further, for example, each of the first principal surface covering portion and the second principal surface covering portion may has a thickness greater than or equal to 10 μm.

This increases the strength of the insulating member, thus making it possible to further reduce damage to the power-generating element.

Further, for example, the first member and the second member may be in contact with the side surface.

This inhibits each material of the power-generating element from deteriorating due to exposure of the side surface of the power-generating element.

Further, for example, an area of contact between the second member and the side surface may be larger than an area of contact of the first member and the side surface.

This increases the area of contact between the second member, which easily deforms under stress caused by expansion and contraction of the power-generating element, and the side surface, thus making it possible to further reduce damage to the insulating member.

Further, for example, at least one of the first member or the second member may contain resin.

This makes processing easy, for example, by heating, thus making it possible to simplify a process of manufacturing a battery.

Further, for example, the first member and the second member may contain an identical type of resin.

This enhances compatibility between the first member and the second member, thus making it possible to enhance the joint strength of the junction between the first member and the second member.

Further, for example, the side surface may be a flat surface.

This makes it easy to cover the side surface of the power-generating element with the insulating member.

Further, for example, the power-generating element may have a plurality of the unit cells laminated.

This makes it possible to enhance the reliability of even a high-capacity or high-voltage laminated battery.

Further, for example, the electrolyte layer may contain a solid electrolyte having lithium-ion conductivity.

This makes it possible to enhance the reliability of a lithium-ion battery containing a solid electrolyte.

The following describes embodiments in concrete terms with reference to the drawings.

It should be noted that the embodiments to be described below each illustrate a comprehensive and specific example. The numerical values, shapes, materials, constituent elements, placement and topology of constituent elements, or other features that are shown in the following embodiments are just a few examples and are not intended to limit the present disclosure.

Further, terms such as “parallel” used herein to show the way in which elements are interrelated, terms such as “flat” and “rectangular” used herein to show the shape of an element, and ranges of numerical values used herein are not expressions that represent only exact meanings but expressions that are meant to also encompass substantially equivalent ranges, e.g. differences of approximately several percent.

Further, the drawings are not necessarily strict illustrations. In the drawings, substantially the same components are given the same reference signs, and a repeated description may be omitted or simplified.

Further, in the present specification and drawings, the x axis, the y axis, and the z axis represent the three axes of a three-dimensional orthogonal coordinate system. In each of the embodiments, the z-axis direction is a direction of laminating of a battery. Further, a positive direction parallel with the z axis is upward in the z-axis direction, and a negative direction parallel with the z axis is downward in the z-axis direction. Further, the term “plan view” used herein means a case where the battery is seen from an angle parallel with the z axis. Further, the term “thickness” used herein means the length of each layer in the direction of laminating.

Further, the terms “upper” and “lower” in the configuration of a battery used herein do not refer to an upward direction (upward in a vertical direction) and a downward direction (downward in a vertical direction) in absolute space recognition, but are used as terms that are defined by a relative positional relationship on the basis of an order of laminating in a laminating configuration. Further, the terms “upper” and “lower” are applied not only in a case where two constituent elements are placed at a spacing from each other with another constituent element present between the two constituent elements, but also in a case where two constituent elements touch each other by being placed in close contact with each other.

Embodiment 1

The following describes a battery according to Embodiment 1. The battery according to Embodiment 1 is a single cell including one electrode layer and one counter-electrode layer.

Configuration

First, a configuration of the battery according to Embodiment 1 is described with reference to the drawings.

Figure 1:
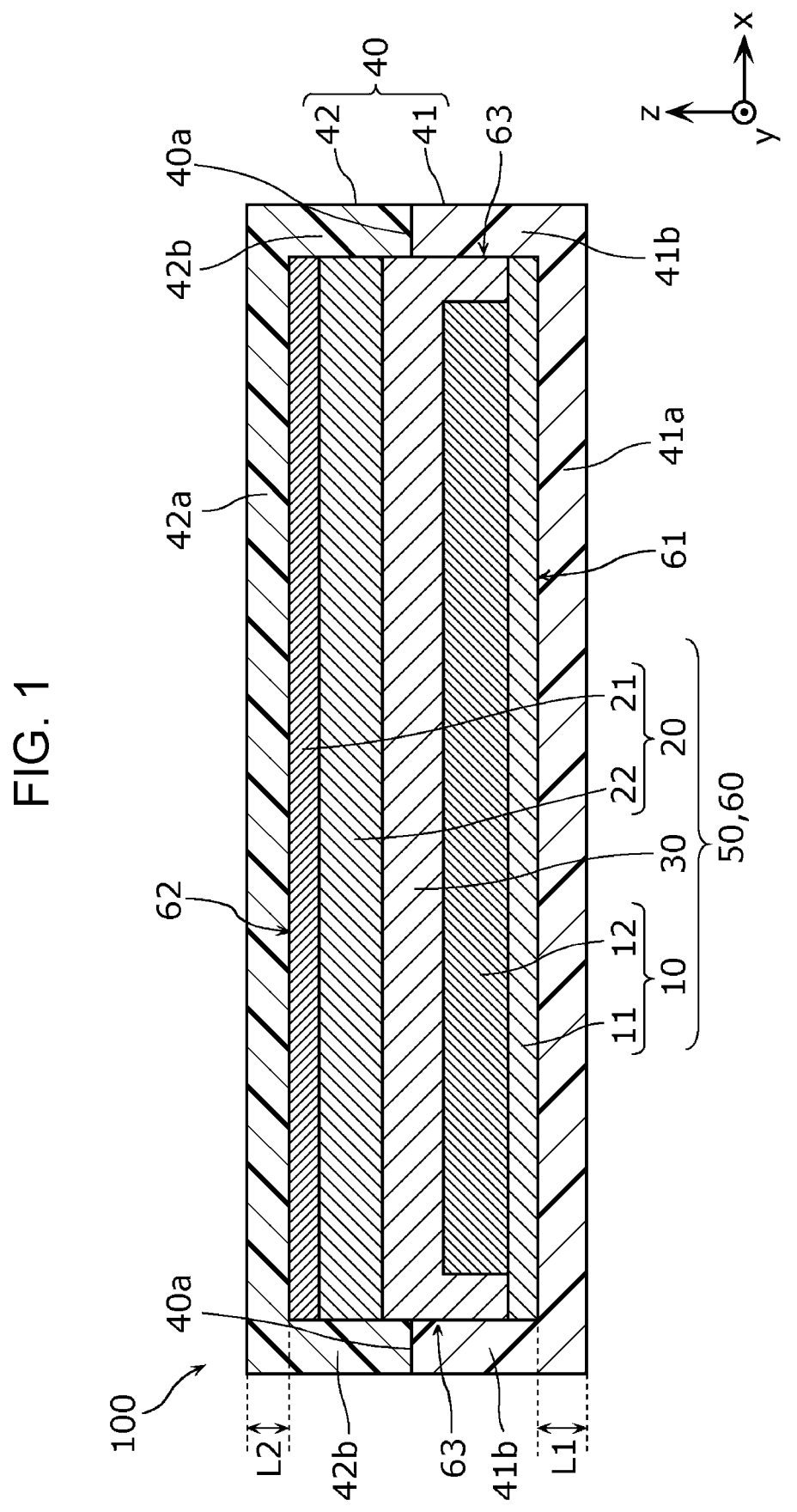

FIG. 1 is a schematic cross-sectional view of a battery 100 according to the present embodiment. FIG. 1 shows a cross-section of the battery 100 as taken along a direction of laminating.

As shown in FIG. 1, the battery 100 according to the present embodiment includes a power-generating element 60 having at least one unit cell 50 and an insulating member 40 covering the power-generating element 60. The battery 100 is for example an all-solid battery. Although, in the present embodiment, the power-generating element 60 is constituted by one unit cell 50, the power-generating element 60 may be constituted by a plurality of the unit cells 50. The unit cell 50 includes an electrode layer 10, a counter-electrode layer 20, and a solid electrolyte layer 30, which is an example of an electrolyte layer located between the electrode layer 10 and the counter-electrode layer 20. The following describes each constituent element of the battery 100 in detail.

The power-generating element 60 has a structure in which the electrode layer 10, the solid electrolyte layer 30, and the counter-electrode layer 20 are laminated in this order. The power-generating element 60 has the shape of, for example, a cuboid. The power-generating element 60 may have another shape such as a circular column or a polygonal column.

The power-generating element 60 has a first principal surface 61, a second principal surface 62, and a side surface 63. The principal surface 61 is a plane perpendicular to the direction of laminating and a plane on which part of the electrode layer 10 (specifically part of a collector 11) is exposed. The second principal surface 62 is a plane of the power-generating element 60 opposite to the first principal surface and a plane on which part of the counter-electrode layer 20 (specifically part of a collector 21) is exposed. The first principal surface 61 and the second principal surface 62 are for example parallel to each other. The side surface 63 is a surface that extends from an end of the first principal surface 61 in a direction across the first principal and that is connected to an end of the second principal surface 62. The side surface 63 is for example perpendicular to the first principal surface 61 and the second principal surface 62. Further, the side surface 63 is for example a flat surface. This makes it easy to cover the side surface 63 of the power-generating element 60 with the insulating member 40 and makes it possible to further enhance the reliability of the battery 100, for example, by increasing the adhesion between the insulating member 40 and the power-generating element 60.

The electrode layer 10 includes the collector 11 and an electrode active material layer 12 located between the collector 11 and the solid electrolyte layer 30.

The collector 11 is in contact with a lower surface of the electrode active material layer 12 and covers the lower surface of the electrode active material layer 12. Further, the lower surface of the collector 11 is covered with a first member 41 of the insulating member 40 and, specifically, is in contact with a first principal surface covering portion 41*a* of the first member 41.

The collector 11 may be made of a publicly-known material. The collector 11 may be made, for example, of a foil-like body, a plate-like body, or a net-like body composed, for example, of copper, aluminum, nickel, iron, t stainless steel, platinum, gold, or an alloy of two or more of these metals.

The collector 11 may be electrically connected to a lead terminal through which to make an external connection. In this case, the lead terminal is not covered with the insulating member 40 but exposed. Further, part of the collector 11 may not be covered with the insulating member 40 but be exposed to make an external electrical connection.

The electrode active material layer 12 is located on top of the collector 11. The electrode active material layer 12 and a counter-electrode active material layer 22 faces each other across the solid electrolyte layer 30. The lower surface of the electrode active material layer 12 is in contact with the collector 11. The electrode active material layer 12 is smaller in width (length in a direction perpendicular to the direction of laminating or, in FIG. 1, length in the x-axis direction) than the collector 11, and the electrode active material layer 12 has its upper and side surfaces covered with the solid electrolyte layer 30. Further, the electrode active material layer 12 is smaller in width than the counter-electrode active material layer 22. The collector 11, the electrode active material layer 12, the counter-electrode active material layer 22 may be equal in width to each other. Further, the electrode active material layer 12 may be greater in width than the counter-electrode active material layer 22. Further, the side surface of the electrode active material layer 12 may be covered with the insulating member 40 instead of being covered with the solid electrolyte layer 30. A material of which the electrode active material layer 12 is made will be described later.

The electrode layer 10 may not include the collector 11 and, for example, a lead terminal for taking out a current may be directly connected to the electrode active material layer 12. Further, in a case where the power-generating element 60 has a plurality of the unit cells 50, collectors of unit cells 50 located next to each other may be shared. That is, the electrode layer 10 may include only the electrode active material layer 12 out of the collector 11 and the electrode active material layer 12.

The counter-electrode layer 20 includes the collector 21 and the counter-electrode active material layer 22, which is located between the collector 21 and the solid electrolyte layer 30.

The collector 21 is in contact with an upper surface of the counter-electrode active material layer 22 and covers the upper surface of the counter-electrode active material layer 22. Further, the upper surface of the collector 21 is covered with a second member 42 of the insulating member 40 and, specifically, is in contact with a second principal surface covering portion 42*a* of the second member 42. The collector 21 may be made of the same material as the aforementioned collector 11.

The collector 21 may be electrically connected to a lead terminal through which to make an external connection. In this case, the lead terminal is not covered with the insulating member 40 but exposed. Further, part of the collector 21 may not be covered with the insulating member 40 but be exposed to make an external electrical connection.

The counter-electrode active material layer 22 is laminated on top of the solid electrolyte layer 30 and placed opposite the electrode active material layer 12. The upper surface of the counter-electrode active material layer 22 is in contact with the collector 21. The counter-electrode active material layer 22 is equal in width to the collector 21. The counter-electrode active material layer 22 may be narrower in width than the collector 21, and a side surface of the counter-electrode active material layer 22 may be covered with the solid electrolyte layer 30 or the insulating member 40. A material of which the counter-electrode active material layer 22 is made will be described later.

The counter-electrode layer 20 may not include the collector 21 and, for example, a lead terminal for taking out a current may be directly connected to the counter-electrode active material layer 22. Further, in a case where the power-generating element 60 has a plurality of the unit cells 50, collectors of unit cells 50 located next to each other may be shared. That is, the counter-electrode layer 20 may include only the counter-electrode active material layer 22 out of the collector 21 and the counter-electrode active material layer 22.

The solid electrolyte layer 30 is located between the electrode active material layer 12 and the counter-electrode active material layer 22. The solid electrolyte layer 30 is in contact with a lower surface of the counter-electrode active material layer 22. Further, the solid electrolyte layer 30 is in contact with the upper and side surfaces of the electrode active material layer 12. Further, the solid electrolyte layer 30 is in contact with the collector 11.

The solid electrolyte layer 30 contains at least a solid electrolyte and, if necessary, may contain a binder material. The solid electrolyte layer 30 may contain a solid electrolyte having lithium-ion conductivity.

As the solid electrolyte, a publicly-known material such as a lithium-ion conductor, a sodium ion conductor, or a magnesium ion conductor may be used. As the solid electrolyte, for example, a solid electrolyte material such as a sulfide solid electrolyte, a halogenated solid electrolyte, or an oxide solid electrolyte is used. In the case of a material that is able to conduct lithium ions, for example, a synthetic substance composed of lithium sulfide ($Li_2S$) and diphosphorous pentasulfide ($P_2S_5$) is used as the sulfide solid electrolyte. Further, as the sulfide solid electrolyte, a sulfide such as $Li_2S—SiS_2$, $Li_2S—B_2S_3$, or $Li_2S—GeS_2$ may be used, or a sulfide obtained by adding at least one type of $Li_3N$, LiCl, LiBr, $Li_3PO_4$, or $Li_4SiO_4$ as an additive to the aforementioned sulfide may be used.

In the case of a material that is able to conduct lithium ions, for example, $Li_7La_3Zr_2O_{12}$ (LLZ), $Li_{1.3}Al_{0.3}Ti_{1.7}(PO_4)_3$ (LATP), (La,Li)$TiO_3$ (LLTO), or other substances are used as the oxide solid electrolyte.

As the binder material, for example, elastomers are used, or an organic compound such as polyvinylidene fluoride, acrylic resin, or cellulose resin may be used.

The respective planimetric shapes of the collector 11, the electrode active material layer 12, the collector 21, the counter-electrode active material layer 22, and the solid electrolyte layer 30 are for example rectangles but may be circles, ellipses, polygons, or other shapes. The respective thicknesses (lengths in the z-axis direction), widths (lengths in the x-axis direction), and depths (lengths in the y-axis direction) of the collector 11, the electrode active material layer 12, the collector 21, the counter-electrode active material layer 22, and the solid electrolyte layer 30 are not limited to particular values but may assume any values.

In the present embodiment, for example, the electrode layer 10, which includes the electrode active material layer 12, is a positive-electrode layer including a positive-electrode active material layer, and the counter electrode 20, which includes the counter-electrode active material layer 22, is a negative-electrode layer including a negative-electrode active material layer. In this case, since the counter-electrode layer 20, which is a negative-electrode layer that tends to expand during charge, is covered with the second member 42, which is relatively low in modulus of elasticity, as will be mentioned later, this makes it hard for the insulating member 40 to be damaged by stress caused by expansion of the negative-electrode layer. Alternatively, the electrode layer 10, which includes the electrode active material layer 12, may be a negative-electrode layer including a negative-electrode active material layer, and the counter electrode 20, which includes the counter-electrode active material layer 22, may be a positive-electrode layer including a positive-electrode active material layer.

The positive-electrode active material layer contain at least a positive-electrode active material and, if necessary, may contain at least one of a solid electrolyte, a conductive auxiliary agent, and a binder material.

As the positive-electrode active material, a publicly-known material that is capable of occlusion and ejection (insertion and desorption or dissolution and deposition) of lithium ions, sodium ions, or magnesium ions may be used. In the case of a material that is capable of desorption and insertion of lithium ions, for example, a lithium cobalt oxide complex oxide (LCO), a lithium nickel oxide complex oxide (LNO), a lithium manganese oxide complex oxide (LMO), a lithium-manganese-nickel complex oxide (LMNO), a lithium-manganese-cobalt complex oxide (LMCO), a lithium-nickel-cobalt complex oxide (LNCO), a lithium-nickel-manganese-cobalt complex oxide (LNMCO), or other substances are used as the positive-electrode active material.

As the solid electrolyte, the aforementioned solid electrolyte material may be used. Further, as the conductive auxiliary agent, for example, a conducting material such as acetylene black, carbon black, graphite, or carbon fiber is used. Further, as the binder material, the aforementioned binder material may be used.

The negative-electrode active material layer contains at least a negative-electrode active material and, if necessary, may contain at least one of a solid electrolyte, a conductive auxiliary agent, and a binder material similar to that of the positive-electrode active material layer.

As the negative-electrode active material, a publicly-known material that is capable of occlusion and ejection (insertion and desorption or dissolution and deposition) of lithium ions, sodium ions, or magnesium ions may be used. In the case of a material that is capable of desorption and insertion of lithium ions, for example, a carbon material such as natural graphite, synthetic graphite, graphite carbon fiber, or resin heat-treated carbon, metal lithium, a lithium alloy, an oxide of lithium and a transition metal element, or other substances are used as the negative-electrode active material.

As the solid electrolyte, the aforementioned solid electrolyte material may be used. Further, as the conductive auxiliary agent, the aforementioned conducting material may be used. Further, as the binder material, the aforementioned binder material may be used.

The insulating member 40 includes the first member 41 and the second member 42. The insulating member 40 covers the first principal surface 61, second principal surface 62, and side surface 63 of the power-generating element 60. The insulating member covers, for example, all of the surface surfaces 63 of the power-generating element 60. The insulating member 40 may seal the power-generating element 60. The side surface 63 may have a portion that is not covered with the insulating member 40. In a case where the power-generating element 60 has the shape of a cuboid having four side surfaces 63, the insulating member 40 may cover, for example, all of the four side surfaces 63 or may cover two of the four side surfaces 63 placed opposite each other.

The first member 41 includes a first principal surface covering portion 41*a* covering the first principal surface 61 of the power-generating element 60 and a first side surface covering portion 41*b* extending from an end of the first principal surface covering portion 41*a* toward a side of the first principal surface covering portion 41*a* that faces the power-generating element 60 and covering the side surface 63. The first member 41 is in contact with the first principal surface 61 and the side surface 63. Specifically, the first principal surface covering portion 41*a* is in contact with the first principal surface 61, and the first side surface covering portion 41*b* is in contact with the side surface 63. This inhibits each material of the power-generating element 60 from deteriorating due to exposure of the side surface 63 of the power-generating element 60. The first principal surface covering portion 41*a* has the shape of, for example, a flat plate.

The second member 42 includes a second principal surface covering portion 42*a* covering the second principal surface 62 of the power-generating element 60 and a second side surface covering portion 42*b* extending from an end of the second principal surface covering portion 42*a* toward a side of the second principal surface covering portion 42*a* that faces the power-generating element 60 and covering the side surface 63. The second member 42 is in contact with the second principal surface 62 and the side surface 63. Specifically, the second principal surface covering portion 42*a* is in contact with the second principal surface 62, and the second side surface covering portion 42*b* is in contact with the side surface 63. This inhibits each material of the power-generating element 60 from deteriorating due to exposure of the side surface 63 of the power-generating element 60. The second principal surface covering portion 42*a* has the shape of, for example, a flat plate.

A junction 40*a* between the first member 41 and the second member 42, more specifically the junction 40*a* between the first side surface covering portion 41*b* and the second side surface covering portion 42*b*, overlaps the side surface 63 of the power-generating element 60 when seen from a direction perpendicular to the side surface 63 (in FIG. 1, the x-axis direction). The junction 40*a* is for example a place where the first member 41 and the second member 42 directly join together at an interface between the first member 41 and the second member 42. The junction 40*a* may be made by the interaction between a surface of the first member 41 and a surface of the second member 42, or may be made by the mixture of a material of the first member 41 and a material of the second member 42. Since the first member 41 and the second member 42 join together at the junction 40*a*, which overlaps the side surface 63 when seen from a direction perpendicular to the side surface 63 of the power-generating element 60, the side surface 63 can be covered with the insulating member 40. Further, since the first member 41 and the second member 42, which are different members, directly join together, the joint interface can be made smaller than in a case where the first member 41 and the second member 42 are joined together via an adhesive or other members. This makes it easy to reduce damage to the insulating member 40 at the junction 40*a*.

Further, although, in the illustrated example, the junction 40*a* extends in a direction perpendicular to the side surface 63, the junction 40*a* may extend in a direction inclined with respect to a direction perpendicular to the side surface 63. Further, the first member 41 and the second member 42 may overlap at some place when seen from a direction perpendicular to the side surface 63. That is, one of the first and second side surface covering portions 41*b* and 42*b* may cover a side of the other opposite to the side surface 63.

Further, the junction 40*a* overlaps a middle part of the side surface 63 in the direction of laminating when seen from a direction perpendicular to the side surface 63. The area of contact between the first member 41 and the side surface 63 is equal to the area of contact between the second member 42 and the side surface 63. The area of contact between the first member 41 and the side surface 63 may be different from the area of contact between the second member 42 and the side surface 63.

An elastic modulus of the first member 41 is higher than an elastic modulus of the second member 42. The elastic modulus is for example a Young's modulus. This imparts such flexibility to the insulating member 40 that high mechanical strength kept by the first member 41 and preferential deformation of the second member 42 by stress caused by expansion and contraction of the power-generating element 60 during charge and discharge prevent the insulating member 40 from being damaged. This makes it possible to effectively protect the power-generating element 60, thus making it possible to enhance the reliability of the battery 100. In a case where the battery 100 is used, the battery 100 is placed so that the first member 41 is located, for example, in such a direction that the first member 41 is susceptible to external shocks and stresses.

The moduli of elasticity of the first and second members 41 and 42 are adjusted to be the intended moduli of elasticity, for example, according to the types of the materials and/or the ratios at which the materials are blended.

The Young's modulus of the first member 41 is for example higher than or equal to 4 GPa, or may be higher than or equal to 5 GPa. No particular upper limit is set on the Young's modulus of the first member 41. The Young's modulus needs only be set according to the thickness or other attributes of the first member 41 so that the power-generating element 60 can be protected.

The Young's modulus of the second member 42 is higher than or equal to 0.1 GPa and lower than or equal to 4 GPa, or may be higher than or equal to 0.2 GPa and lower than or equal to 2 GPa. This makes it possible to give the second member 42 moderate flexibility and strength.

Further, the difference in Young's modulus between the first member 41 and the second member 42 is for example greater than or equal to 1 GPa, or may be greater than or equal to 2 GPa.

The respective materials of the first and second members 41 and 42 are not limited to particular materials, provided they are materials having the aforementioned modulus of elasticity relationship and having heat-resisting and insulating properties required during use in the battery 100. At least one of the first member 41 and the second member 42 contains, for example, resin. This makes processing easy, for example, by heating, thus making it possible to simplify a process of manufacturing a battery 100. Further, the first member 41 and the second member 42 can be joined together by heating, pressurization, or other processes without using an adhesive or other members. Further, at least one of the first member 41 and the second member 42 contains, for example, an inorganic compound. This makes it possible to adjust the moduli of elasticity of the first and second members 41 and 42 by adjusting the amounts in which high-strength inorganic compounds are blended.

The first member 41 and the second member 42 may each be constituted solely of resin, or may be constituted by resin and an inorganic compound. Further, in a case where the first member 41 and the second member 42 contain resin, the first member 41 and the second member 42 may each be composed mostly of a thermosetting resin and/or a thermoplastic resin as the resin, soften by heating, and constituted by a resin composition having a film forming ability. The first member 41 and the second member 42 may each be constituted by a resin composition containing an inorganic compound. The first member 41 and the second member 42 may contain the same type of material.

Examples of the resin contained in the first member 41 and the second member 42 include epoxy resin, acrylic resin, polyimide resin, polyamide-imide resin, polycyanate resin, polyester resin, silicone resin, and thermosetting polyphenylene ether resin. The resin contained in the first member 41 and the second member 42 may be a thermosetting resin and/or a thermoplastic resin. The first member 41 and the second member 42 may each contain one type of resin or may contain a combination of two or more types of resin. Alternatively, the first member 41 and the second member 42 may each be constituted by a plurality of film layers having a multi-layer structure.

Further, the first member 41 and the second member 42 may contain the same type of resin. In this case, for example, by the first member 41 containing more of a high-strength material such as an inorganic material than the second member 42, an elastic modulus of the first member 41 can be made higher than an elastic modulus of the second member 42. By the first member 41 and the second member 42 containing the same type of resin, the compatibility between the first member and the second member can be enhanced. This makes it possible to enhance the joint strength of the junction 40*a* between the first member 41 and the second member 42.

Further, the second member 42 may have a glass transition temperature lower than normal temperatures and contain resin, such as crystalline resin or cross-linked resin, that is in a solid state at normal temperatures. Thus, the second member 42 contains resin that undergoes glass transition at normal temperatures. This makes it possible to further increase the flexibility of the second member 42 and makes it harder for the second member 42 to be damaged by stress caused by expansion and contraction of the power-generating element 60 during charge and discharge.

Examples of the inorganic materials that are contained in the first member 41 and the second member 42 include barium oxide, calcium carbide, barium titanate, silicon oxide, titanium oxide, and aluminum oxide.

The thickness L1 of the first principal surface covering portion 41*a* is equal to the thickness L2 of the second principal surface covering portion 42*a*. Further, the thickness L1 of the first principal surface covering portion 41*a* and the thickness L2 of the second principal surface covering portion 42*a* may each for example be greater than or equal to 10 μm, greater than or equal to 50 μm, or greater than or equal to 200 μm. This increases the strength of the insulating member 40, thus making it possible to further reduce damage to the power-generating element 60. Further, from the point of view of volume energy density, the thickness L1 of the first principal surface covering portion 41*a* and the thickness L2 of the second principal surface covering portion 42*a* may each be less than or equal to 1000 μm, less than or equal to 200 μm, or less than or equal to 100 μm.

The thickness L1 of the first principal surface covering portion 41*a* may be different from the thickness L2 of the second principal surface covering portion 42*a*. In this case, breakage of the insulating member 40 can be inhibited, for example, by increasing the thickness of a principal surface that is susceptible to shocks such as vibrations and/or a principal surface to which stress is easily applied. This makes it possible to further enhance the reliability of the battery 100.

Further, the thickness of the first side surface covering portion 41*b* is equal to the thickness of the second side surface covering portion 42*b*. The thickness of the first side surface covering portion 41*b* may be different from the thickness of the second side surface covering portion 42*b*. Further, the thickness of the first side surface covering portion 41*b* and the thickness of the second side surface covering portion 42*b* may each be equal to or different from the thickness L1 of the first principal surface covering portion 41*a* or the thickness L2 of the second principal surface covering portion 42*a*. The thickness of the first side surface covering portion 41*b* and the thickness of the second side surface covering portion 42*b* are each for example greater than or equal to 10 μm.

Further, a surface of the first side surface covering portion 41*b* that faces away from the side surface 63 and a surface of the second side surface covering portion 42*b* that faces away from the side surface 63 are flush with each other. That is, the surface of the first side surface covering portion 41*b* that faces away from the side surface 63 and the surface of the second side surface covering portion 42*b* that faces away from the side surface 63 form a flat surface. This makes it hard for an air gap to be formed between batteries 100 in a case where the batteries 100 are integrated for use, bringing about improvement in energy density.

Further, although not illustrated, the battery 100 may further include a plate-like reinforcing member covering at least one of upper and lower surfaces of the insulating member 40. For example, the reinforcing member is provided in contact with a surface of the second principal surface covering portion 42*a* that faces away from the power-generating element 60. This causes the second member 42, which is relatively low in modulus of elasticity, to be protected by the reinforcing member, thus making it possible to reduce damage to the power-generating element 60. Usable examples of the reinforcing member include a ceramic substrate containing alumina or other substances, a resin substrate containing epoxy resin or other substances, or a prepreg obtained by impregnating carbon fiber, glass cloth, or other materials with resin such as epoxy resin. The reinforcing member may be provided in contact with a surface of the first principal surface covering portion 41*a* that faces away from the power-generating element 60.

As noted above, the battery 100 includes a power-generating element 60 and an insulating member 40 covering the power-generating element 60. The insulating member 40 includes a first member 41 and a second member 42 joined to the first member 41, and an elastic modulus of the first member 41 is higher than an elastic modulus of the second member 42. The junction 40*a* between the first member 41 and the second member 42 overlaps the side surface 63 of the power-generating element 60 when seen from a direction perpendicular to the side surface 63.

This causes the power-generating element 60 to be firmly protected by the first member 41, which is relatively high in modulus of elasticity, and causes the second member 42, which is relatively low in modulus of elasticity, to preferentially deform under stress caused by expansion and contraction of the power-generating element 60 during charge and discharge, thereby reducing damage to the insulating member 40. Further, since the junction 40*a* is located outside the side surface 63, the side surface 63 is covered with the insulating member 40. Further, since the first member 41 and the second member 42 directly join together, the joint interface can be made smaller than in a case where the first member 41 and the second member 42 are joined together with use of another member. This reduces damage to the insulating member 40 at the joint interface. This makes it possible to effectively protect the power-generating element 60, thus making it possible to achieve a highly-reliable battery 100.

Modification 1

The following describes Modification 1 of Embodiment 1. The following describes Modification 1 of Embodiment 1 with a focus on differences from Embodiment 1 and omits or simplifies a description of common features.

Figure 2:
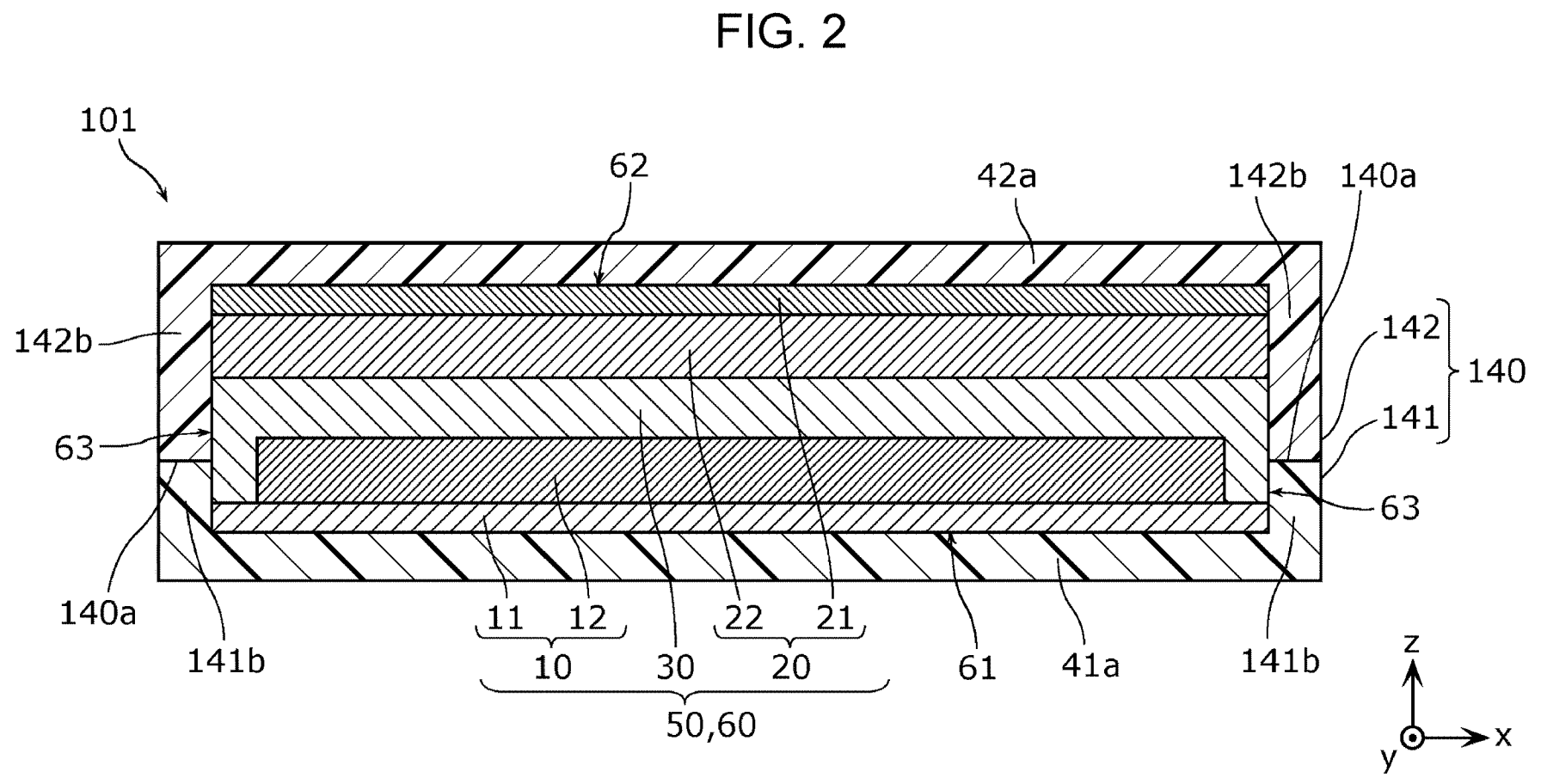

FIG. 2 is a schematic cross-sectional view of a battery 101 according to the present modification. FIG. 2 shows a cross-section of the battery 101 as taken along the direction of laminating. The battery 101 differs from the battery 100 in that the battery 101 includes an insulating member 140 instead of the insulating member 40.

As shown in FIG. 2, the battery 101 according to the present modification includes a power-generating element 60 and an insulating member 140 covering the power-generating element 60.

The insulating member 140 includes a first member 141 and a second member 142.

The first member 141 includes a first principal surface covering portion 41*a* covering the first principal surface 61 of the power-generating element 60 and a first side surface covering portion 141*b* extending from an end of the first principal surface covering portion 41*a* toward a side of the first principal surface covering portion 41*a* that faces the power-generating element 60 and covering the side surface 63.

The second member 142 includes a second principal surface covering portion 42*a* covering the second principal surface 62 of the power-generating element 60 and a second side surface covering portion 142*b* extending from an end of the second principal surface covering portion 42*a* toward a side of the second principal surface covering portion 42*a* that faces the power-generating element 60 and covering the side surface 63.

A junction 140*a* between the first member 141 and the second member 142, more specifically the junction 140*a* between the first side surface covering portion 141*b* and the second side surface covering portion 142*b*, overlaps the side surface 63 of the power-generating element 60 when seen from a direction perpendicular to the side surface 63.

When seen from a direction perpendicular to the side surface 63, the junction 140*a* is located closer to the electrode layer 10 than a middle part of the side surface 63 in the direction of laminating. The area of contact between the first member 141 and the side surface 63 is larger than the area of contact between the second member 142 and the side surface 63. This increases the area of contact between the second member 142, which easily deforms under stress caused by expansion and contraction of the power-generating element 60, and the side surface 63, thus making it possible to further reduce damage to the insulating member 140.

Modification 2

The following describes Modification 2 of Embodiment 1. The following describes Modification 2 of Embodiment 1 with a focus on differences from Embodiment 1 and omits or simplifies a description of common features.

Figure 3:
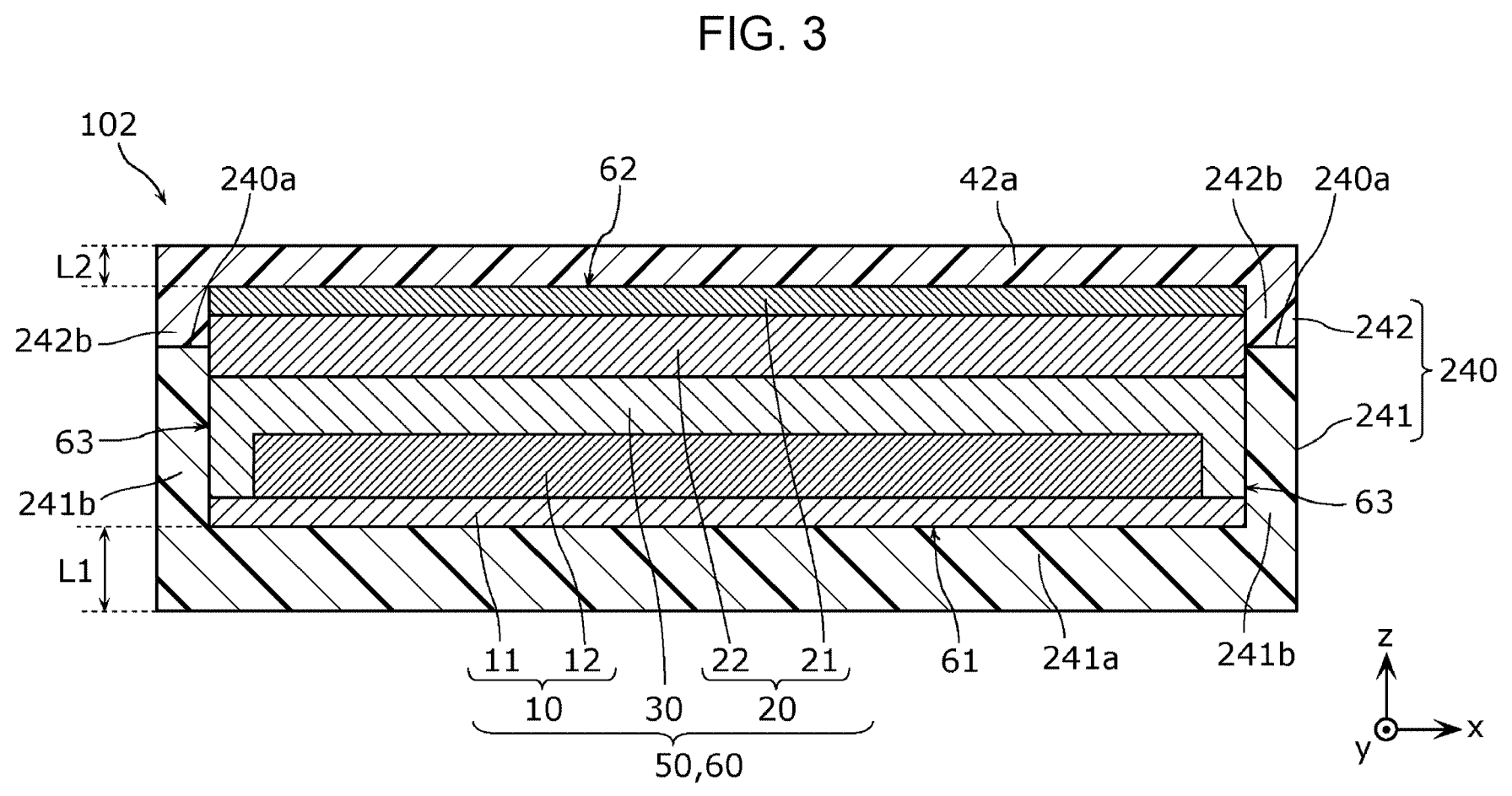

FIG. 3 is a schematic cross-sectional view of a battery 102 according to the present modification. FIG. 3 shows a cross-section of the battery 102 as taken along the direction of laminating. The battery 102 differs from the battery 100 in that the battery 102 includes an insulating member 240 instead of the insulating member 40.

As shown in FIG. 3, the battery 102 according to the present modification includes a power-generating element 60 and an insulating member 240 covering the power-generating element 60.

The insulating member 240 includes a first member 241 and a second member 242.

The first member 241 includes a first principal surface covering portion 241*a* covering the first principal surface 61 of the power-generating element 60 and a first side surface covering portion 241*b* extending from an end of the first principal surface covering portion 241*a* toward a side of the first principal surface covering portion 241*a* that faces the power-generating element 60 and covering the side surface 63.

The second member 242 includes a second principal surface covering portion 42*a* covering the second principal surface 62 of the power-generating element 60 and a second side surface covering portion 242*b* extending from an end of the second principal surface covering portion 42*a* toward a side of the second principal surface covering portion 42*a* that faces the power-generating element 60 and covering the side surface 63.

A junction 240*a* between the first member 241 and the second member 242, more specifically the junction 240*a* between the first side surface covering portion 241*b* and the second side surface covering portion 242*b*, overlaps the side surface 63 of the power-generating element 60 when seen from a direction perpendicular to the side surface 63.

When seen from a direction perpendicular to the side surface 63, the junction 240*a* is located closer to the counter-electrode layer 20 than a middle part of the side surface 63 in the direction of laminating. The area of contact between the first member 241 and the side surface 63 is smaller than the area of contact between the second member 242 and the side surface 63. This increases the area of contact between the first member 241, which is relatively high in modulus of elasticity, and the side surface 63, thus making it possible to further reduce damage to the power-generating element 60 by external shocks or other impacts.

Further, the thickness L1 of the first principal surface covering portion 241*a* is different from the thickness L2 of the second principal surface covering portion 42*a*. Specifically, the thickness L1 of the first principal surface covering portion 241*a* is greater than the thickness L2 of the second principal surface covering portion 42*a*. This increase the thickness L1 of the first principal surface covering portion 241*a* of the first member 241, which is relatively high in modulus of elasticity, thus making it possible to further reduce damage to the power-generating element 60 by external shocks or other impacts.

Modification 3

The following describes Modification 3 of Embodiment 1. The following describes Modification 3 of Embodiment 1 with a focus on differences from Embodiment 1 and omits or simplifies a description of common features.

FIG. 4 is a schematic cross-sectional view of a battery 103 according to the present modification. FIG. 4 shows a cross-section of the battery 103 as taken along the direction of laminating. The battery 103 differs from the battery 100 in that the battery 103 includes an insulating member 340 instead of the insulating member 40.

As shown in FIG. 4, the battery 103 according to the present modification includes a power-generating element 60 and an insulating member 340 covering the power-generating element 60.

The insulating member 340 includes a first member 341 and a second member 342.

The first member 341 includes a first principal surface covering portion 41*a* covering the first principal surface 61 of the power-generating element 60 and a first side surface covering portion 341*b* extending from an end of the first principal surface covering portion 41*a* toward a side of the first principal surface covering portion 41*a* that faces the power-generating element 60 and covering the side surface 63.

The second member 342 includes a second principal surface covering portion 42*a* covering the second principal surface 62 of the power-generating element 60 and a second side surface covering portion 342*b* extending from an end of the second principal surface covering portion 42*a* toward a side of the second principal surface covering portion 42*a* that faces the power-generating element 60 and covering the side surface 63.

A junction 340*a* between the first member 341 and the second member 342, more specifically the junction 340*a* between the first side surface covering portion 341*b* and the second side surface covering portion 342*b*, overlaps the side surface 63 of the power-generating element 60 when seen from a direction perpendicular to the side surface 63. Further, the insulating member 340 has a projection 340*b* at which a place where the junction 340*a* is provided projects in a direction away from the side surface 63. This enhances strength against external shocks and stresses and stress caused by expansion and contraction of the power-generating element 60 during charge and discharge. Further, an air gap 343 is provided between the junction 340*a* and the side surface 63. This makes it possible to relax the stress caused by external shocks or other impacts and the stress caused by expansion and contraction of the power-generating element 60 during charge and discharge.

Figure 5:
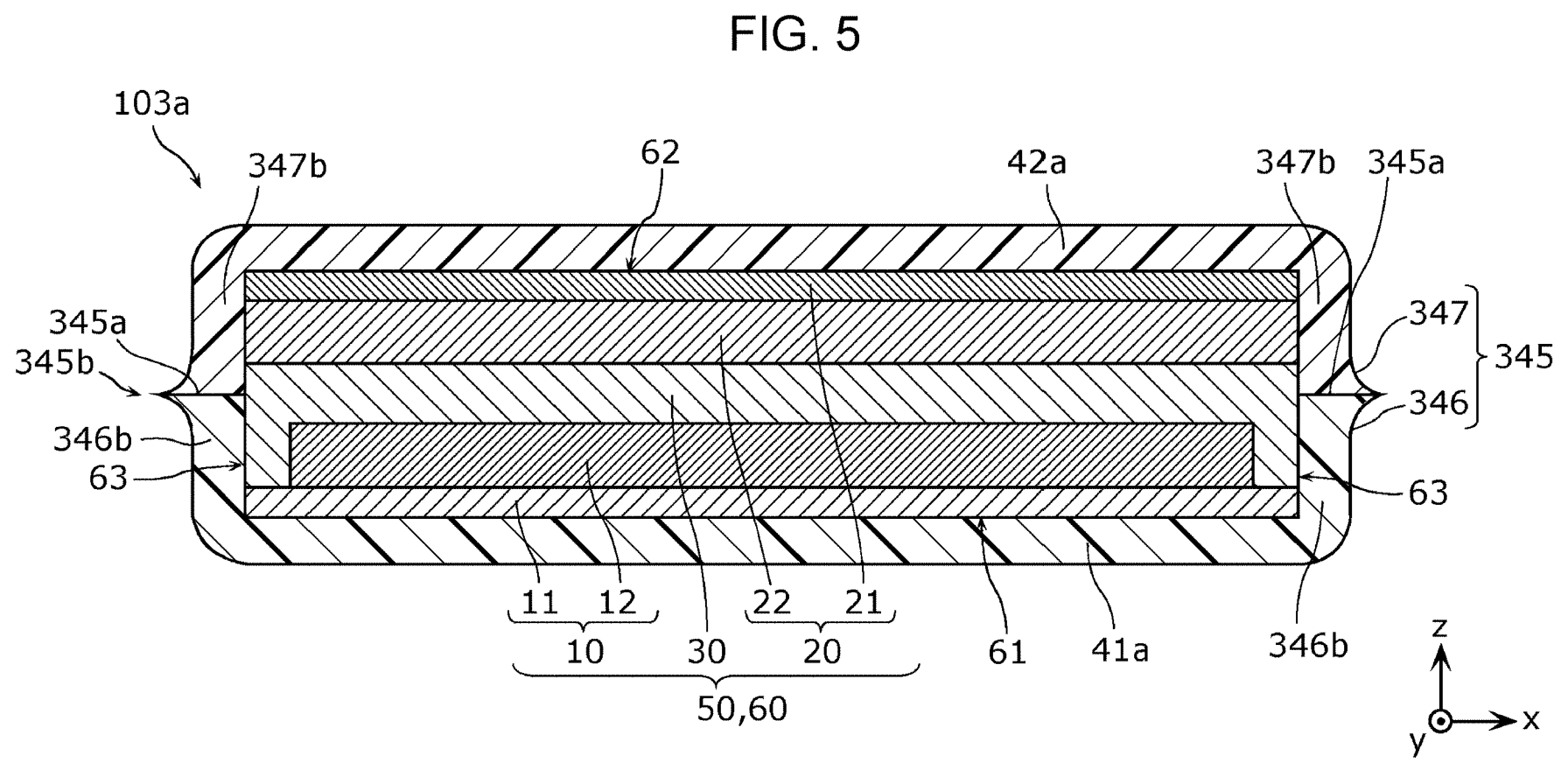

The air gap 343 does not need to be provided between the junction 340*a* and the side surface 63. FIG. 5 is a schematic cross-sectional view of another battery 103*a* according to the present modification. FIG. 5 shows a cross-section of the battery 103*a* as taken along the direction of laminating. The battery 103*a* is a battery not provided with an air gap 343 unlike the battery 103.

As shown in FIG. 5, the battery 103*a* includes the power-generating element 60 and an insulating member 345 covering the power-generating element 60.

The insulating member 345 includes a first member 346 and a second member 347.

The first member 346 includes a first principal surface covering portion 41*a* covering the first principal surface 61 of the power-generating element 60 and a first side surface covering portion 346*b* extending from an end of the first principal surface covering portion 41*a* toward a side of the first principal surface covering portion 41*a* that faces the power-generating element 60 and covering the side surface 63.

The second member 347 includes a second principal surface covering portion 42*a* covering the second principal surface 62 of the power-generating element 60 and a second side surface covering portion 347*b* extending from an end of the second principal surface covering portion 42*a* toward a side of the second principal surface covering portion 42*a* that faces the power-generating element 60 and covering the side surface 63.

A junction 345*a* between the first member 346 and the second member 347, more specifically the junction 345*a* between the first side surface covering portion 346*b* and the second side surface covering portion 347*b*, overlaps the side surface 63 of the power-generating element 60 when seen from a direction perpendicular to the side surface 63. Further, the insulating member 345 has a projection 345*b* at which a place where the junction 345*a* is provided projects in a direction away from the side surface 63. This enhances strength against external shocks and stresses.

Method for Manufacturing Battery

Next, an example of a method for manufacturing a battery according to the present embodiment is described. The following description gives a description with a focus on a method for manufacturing a battery 100 according to Embodiment 1. The manufacturing method to be described below is just an example, and the method for manufacturing a battery according to the present embodiment is not limited to the following method.

First, a power-generating element 60 is formed. The power-generating element 60 can be formed by using a publicly-known method for manufacturing a power-generating element of a battery. In the present embodiment, since the power-generating element 60 is constituted by one unit cell 50, the power-generating element 60 is formed by forming the unit cell 50. For example, first, an electrode plate is formed by laminating an electrode active material layer 12 and a solid electrolyte layer 30 in this order on top of a collector 11. Further, a counter-electrode plate is formed by laminating a counter-electrode active material layer 22 and a solid electrolyte layer 30 in this order on top of a collector 21. The electrode and counter-electrode plates thus formed are laminated such that their respective solid electrolyte layers 30 are in contact with each other. The laminated body thus laminated is pressed by a planar press from both sides in the direction of laminating, whereby a power-generating element 60 constituted by one unit cell 50 is obtained.

Figure 6:
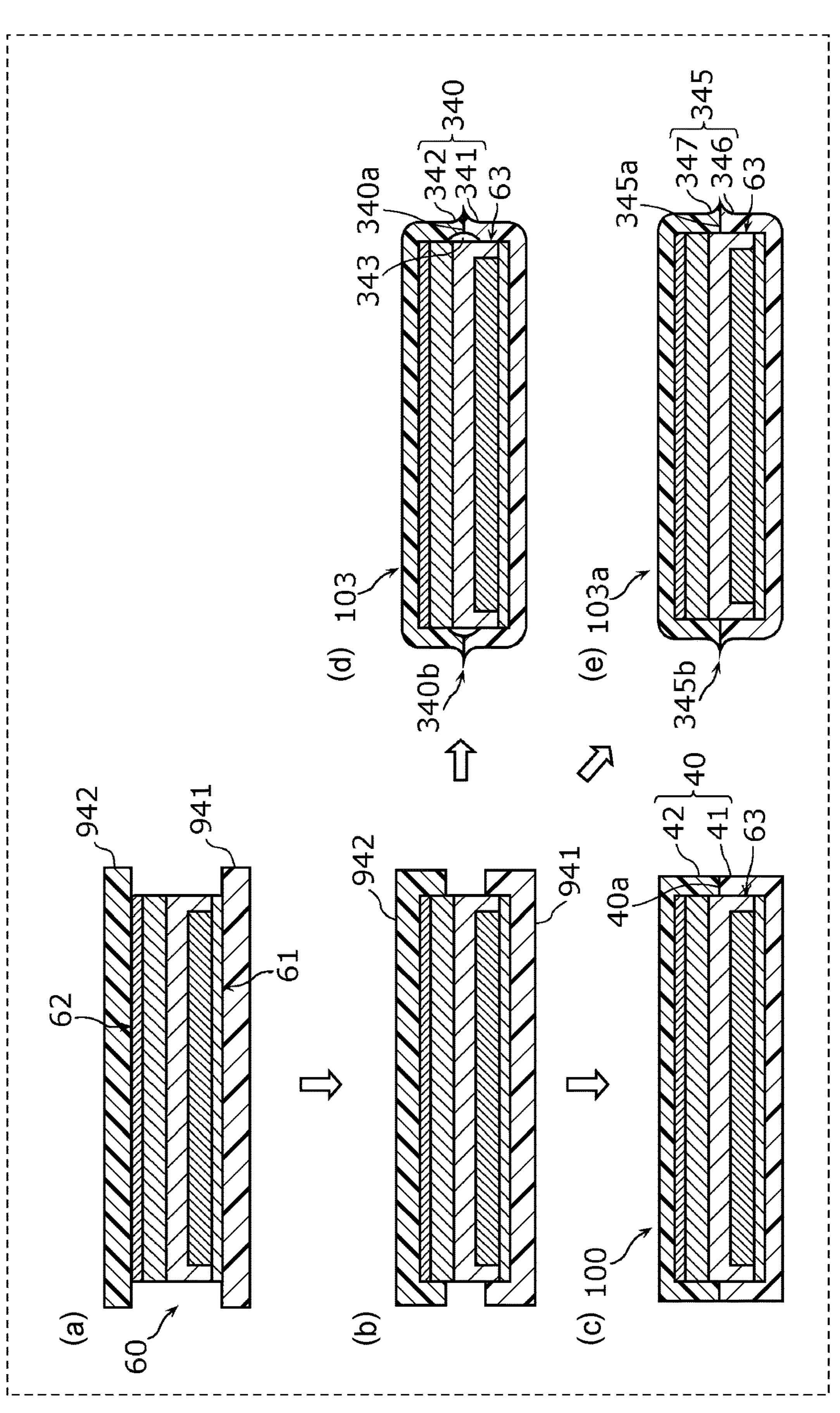
FIG. 6 is a diagram for explaining a step of covering a power-generating element with an insulating member according to Embodiment 1.

Next, the power-generating element 60 thus obtained is covered with an insulating member 40. FIG. 6 is a diagram for explaining a step of covering the power-generating element 60 with the insulating member 40.

First, as shown in (a) of FIG. 6, the power-generating element 60 is sandwiched between upper and lower sheet-like resin compositions. The sheet-like resin composition is for example resin compositions that contain resin or an inorganic material taken as examples of materials of the aforementioned first and second members 41 and 42 and that is in a solid state at normal temperatures. For example, a sheet-like first resin composition 941 of which the first material 41 is made is placed on a first principal surface 61 of the power-generating element 60, and a sheet-like second resin composition 942 of which the second material 42 is made is placed on a second principal surface 62 of the power-generating element 60.

Next, the power-generating element 60 sandwiched between the first resin composition 941 and the second resin composition 942 is heated while being retained in a die, whereby as shown in (b) of FIG. 6, the first resin composition 941 and the second resin composition 942 start to flow.

For example, the power-generating element 60 sandwiched between the first resin composition 941 and the second resin composition 942 is placed into a cuboidal die, and the first resin composition 941, the power-generating element 60, and the second resin composition 942 are heated and pressurized. According to this, as shown in (c) of FIG. 6, the first resin composition 941 and the second resin composition 942 are joined together at a place overlapping a side surface 63 of the power-generating element 60 when seen from a direction perpendicular to the side surface 63, and first and second members 41 and 42 joined together at a junction 40*a* are formed. This gives a battery 100 whose power-generating element 60 is covered with an insulating member 40.

Further, batteries 101 and 102 other than the battery 100 may be formed by adjusting the shapes of the first and second resin compositions 941 and 942, the shape of the die, and heating and pressurization conditions.

Further, the heating and pressurization of the power-generating element 60 sandwiched between the first resin composition 941 and the second resin composition 942 may involve the use of a vacuum laminator, a vacuum press, or other devices. For example, the power-generating element 60 sandwiched between the first resin composition 941 and the second resin composition 942 is further sandwiched between carrier films, carried to a vacuum press, and subjected to warming and vacuum pressing. This causes the first resin composition 941 and the second resin composition 942 to conform to the shape of the power-generating element 60 to be joined together at a place overlapping the side surface 63 of the power-generating element 60 when seen from a direction perpendicular to the side surface 63, whereby a first member and a second member are formed. In so doing, by adjusting temperature and vacuum pressing conditions, a battery 103, provided with an air gap 343, whose power-generating element 60 is covered with an insulating member 340 can be formed as shown in (d) of FIG. 6 or a battery 103*a*, provided with no air gap 343, whose power-generating element 60 is covered with an insulating member 345 can be formed as shown in (e) of FIG. 6. Further, due to pressurization via the carrier films without use of a die or other devices, the outer sides of places in the insulating member covering the side surface 63 do not make perpendicular surfaces, so that projections 340*b* and 345*b* are formed.

Using such a vacuum laminator, a vacuum press, or other devices makes it possible to put the power-generating element 60 sandwiched between the first resin composition 941 and the second resin composition 942 on the carrier films and continuously carry, warm, and heat the power-generating element 60, thus making it possible to manufacture batteries with high producibility. Further, during vacuum pressing, the power-generating element 60 may also be pressed by heat plates from above and below. This makes it possible to improve the smoothness of the upper and lower surfaces of the battery (i.e. the uniformity in thickness of the insulating member). Further, vacuum pressing may be performed a plurality of times.

The first resin composition 941 and the second resin composition 942 contain, for example, a thermosetting resin. This causes the first resin composition 941 and the second resin composition 942 to easily soften by heating until curing progresses and, after curing, retain their shapes even without being cooled. This makes it possible to shorten the duration of vacuum pressing.

Further, in the manufacture of a battery 100 shown in (c) of FIG. 6, the battery 100 may be manufactured by, after having manufactured a battery 103*a* shown in (e) of FIG. 6, cutting off ends of the insulating member 345 to arrange the shape of the insulating member.

The aforementioned method is not the only method for covering the power-generating element 60 with the insulating member 40. The power-generating element 60 may be covered with the insulating member 40, for example, by immersing the power-generating element 60 in a resin composition or by supplying a resin composition to a surface of the power-generating element 60 with use of a coating means such as a spray. Alternatively, the power-generating element 60 may be covered with the insulating member 40 by pouring a resin composition into a die in which the power-generating element 60 is placed.

Embodiment 2

Next, a battery according to Embodiment 2 is described. The battery according to Embodiment 2 is a laminated battery including a laminating body of single cells. The following description gives a description with a focus on differences from Embodiment 1 and omits or simplifies a description of common features.

Figure 7:
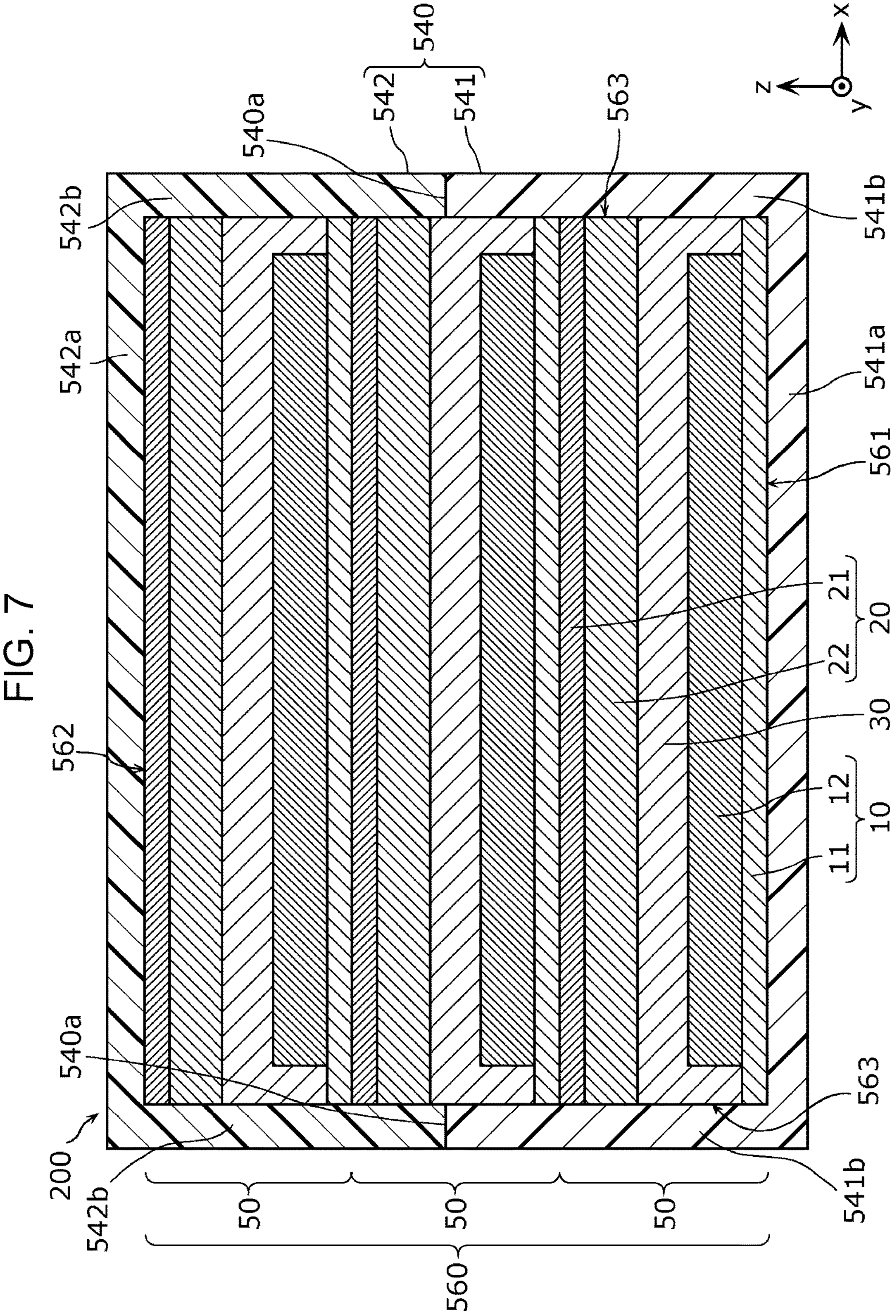
FIG. 7 is a schematic cross-sectional view of a battery according to Embodiment 2.

FIG. 7 is a schematic cross-sectional view of a battery 200 according to the present embodiment. FIG. 7 shows a cross-section of the battery 200 as taken along a direction of laminating.

As shown in FIG. 7, the battery 200 according to the present embodiment includes a power-generating element 560 having a plurality of unit cell 50 laminated and an insulating member 540 covering the power-generating element 560. Although, in the present embodiment, the power-generating element 560 is constituted by three unit cells 50, the power-generating element 560 may be constituted by two unit cells 50 or may be constituted four or more unit cells 50.

The plurality of unit cells 50 are laminated such that the electrode layer 10 of one of unit cells 50 adjacent to each other in the direction of laminating faces the counter-electrode layer 20 of the other of the unit cells 50. That is, the battery 200 is a series laminated battery. This makes it possible to a high-voltage battery 200. Although, in FIG. 7, the plurality of unit cells 50 are laminated such that a collector 11 and a collector 21 are in contact with each other, one of adjacent collectors 11 and 21 may be omitted and the other of the collectors may be shared by adjacent unit cells 50.

The insulating member 540 includes a first member 541 and a second member 542.

The first member 541 includes a first principal surface covering portion 541*a* covering a first principal surface 561 of the power-generating element 560 and a first side surface covering portion 541*b* extending from an end of the first principal surface covering portion 541*a* toward a side of the first principal surface covering portion 541*a* that faces the power-generating element 560 and covering a side surface 563.

The second member 542 includes a second principal surface covering portion 542*a* covering a second principal surface 562 of the power-generating element 560 and a second side surface covering portion 542*b* extending from an end of the second principal surface covering portion 542*a* toward a side of the second principal surface covering portion 542*a* that faces the power-generating element 560 and covering the side surface 563.

A junction 540*a* between the first member 541 and the second member 542, more specifically the junction 540*a* between the first side surface covering portion 541*b* and the second side surface covering portion 542*b*, overlaps the side surface 563 of the power-generating element 560 when seen from a direction perpendicular to the side surface 563.

Even in such a laminated battery 200 including a power-generating element 560 having a plurality of unit cells 50, covering the power-generating element 560 with an insulating member 540 having a first member 541 and a second member 542 brings about effects which are similar to those of the battery 100 of Embodiment 1, making it possible to achieve a highly-reliable battery 200.

The battery 200 is manufactured, for example, by laminating a plurality of unit cells 50 to form a power-generating element 560 and covering the power-generating element with an insulating member 540 in a manner similar to the method for manufacturing a battery according to Embodiment 1.

Instead of being a series laminated battery, the battery 200 may be a battery including a parallel laminated power-generating element having a structure in which the plurality of unit cells 50 are laminated such that the electrode layers

10 or counter-electrode layers 20 of unit cells 50 adjacent to each other face each other. A parallel laminated battery can make a high-voltage battery.

OTHER EMBODIMENTS

In the foregoing, a battery according to the present disclosure and a method for manufacturing the same have been described with reference to embodiments; however, the present disclosure is not intended to be limited to these embodiments. Applications to the present embodiments of various types of modification conceived of by persons skilled in the art and other embodiments constructed by combining some constituent elements of the embodiments are encompassed in the scope of the present disclosure, provided such applications and embodiments do not depart from the spirit of the present disclosure.

Although, in each of the embodiments described above, a unit cell of a power-generating element is constituted by a collector, an electrode active material layer, an insulating layer, a solid electrolyte layer, and a counter-electrode active material layer, this is not intended to impose any limitation. For example, in an allowable range of battery characteristics, a joining layer or other layers for reduction in electrical resistance, improvement in joint strength, or other purposes may be provided between one layer of the unit cell and another.

Further, although, in each of the embodiments described above, the power-generating element is covered with an insulating layer in direct contact with the power-generating element, this is not intended to impose any limitation. For example, another member such as a reinforcing member or an adhesive may be disposed between the insulating member and the power-generating element.

Further, although, in each of the embodiments described above, the side surface of the power-generating element is a flat surface, this is not intended to impose any limitation. For example, the side surface of the power-generating element may have asperities. The presence of the asperities on the side surface allows the insulating member to be bit by the asperities, thus making it hard for the insulating member to delaminate from the power-generating element.

Further, the foregoing embodiments are subject, for example, to various changes, substitutions, additions, and omissions in the scope of the claims or the scope of equivalents thereof.

A battery according to the present disclosure may be used as a secondary battery such as an all-solid battery for use, for example, in various types of electronics, automobiles, or other devices.

What is claimed is:

1. A battery comprising:

a power-generating element having at least one unit cell including an electrode layer, a counter-electrode layer, and an electrolyte layer located between the electrode layer and the counter-electrode layer, wherein a first principal surface of the electrolyte layer contacts an opposing surface of the counter-electrode layer and a second principal surface of the electrolyte layer contacts an opposing surface of the electrode layer; and an insulating member covering the power-generating element, wherein the insulating member includes a first member that includes a first principal surface covering portion covering a first principal surface of the power-generating element, and a second member, joined to the first member, that includes a second principal surface covering portion covering a second principal surface of the power-generating element opposite to the first principal surface, a junction between the first member and the second member overlaps a side surface of the power-generating element when seen from a direction perpendicular to the side surface, wherein the first member and the second member include opposing surfaces that contact each other at the junction, wherein both the first principal surface of the electrolyte layer and the second principal surface of the electrolyte layer are vertically offset from the junction when seen from the direction perpendicular to the side surface, and an elastic modulus of the first member is higher than an elastic modulus of the second member.

2. The battery according to claim 1, wherein the first principal surface covering portion and the second principal surface covering portion are different in thickness from each other.

3. The battery according to claim 1, wherein a thickness of the first principal surface covering portion is greater than a thickness of the second principal surface covering portion.

4. The battery according to claim 1, wherein each of the first principal surface covering portion and the second principal surface covering portion has a thickness greater than or equal to 10 μm.

5. The battery according to claim 1, wherein the first member and the second member are in contact with the side surface.

6. The battery according to claim 5, wherein an area of contact between the second member and the side surface is larger than an area of contact of the first member and the side surface.

7. The battery according to claim 1, wherein at least one of the first member or the second member contains resin.

8. The battery according to claim 7, wherein the first member and the second member contain an identical type of resin.

9. The battery according to claim 1, wherein the side surface is a flat surface.

10. The battery according to claim 1, wherein the power-generating element has a plurality of the unit cells which are laminated.

11. The battery according to claim 1, wherein the electrolyte layer contains a solid electrolyte having lithium-ion conductivity.

* * * * *